S. FAIRCHILD.
Carriage-Spring.
No. 5,413.
2 Sheets—Sheet 1.
Patented Jan. 18, 1848.
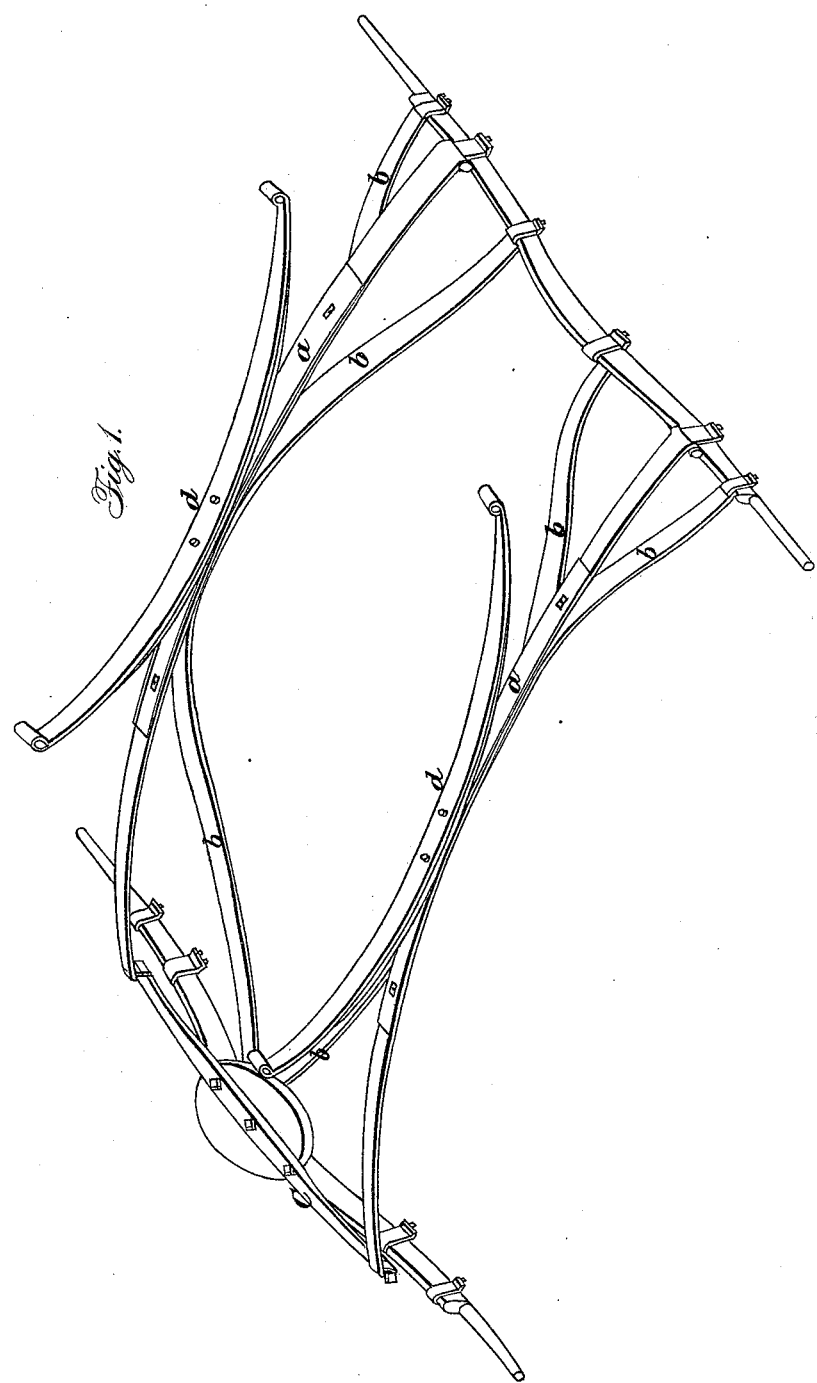

S. FAIRCHILD.
Carriage-Spring.
No. 5,413.
2 Sheets—Sheet 2.
Patented Jan 18, 1848.
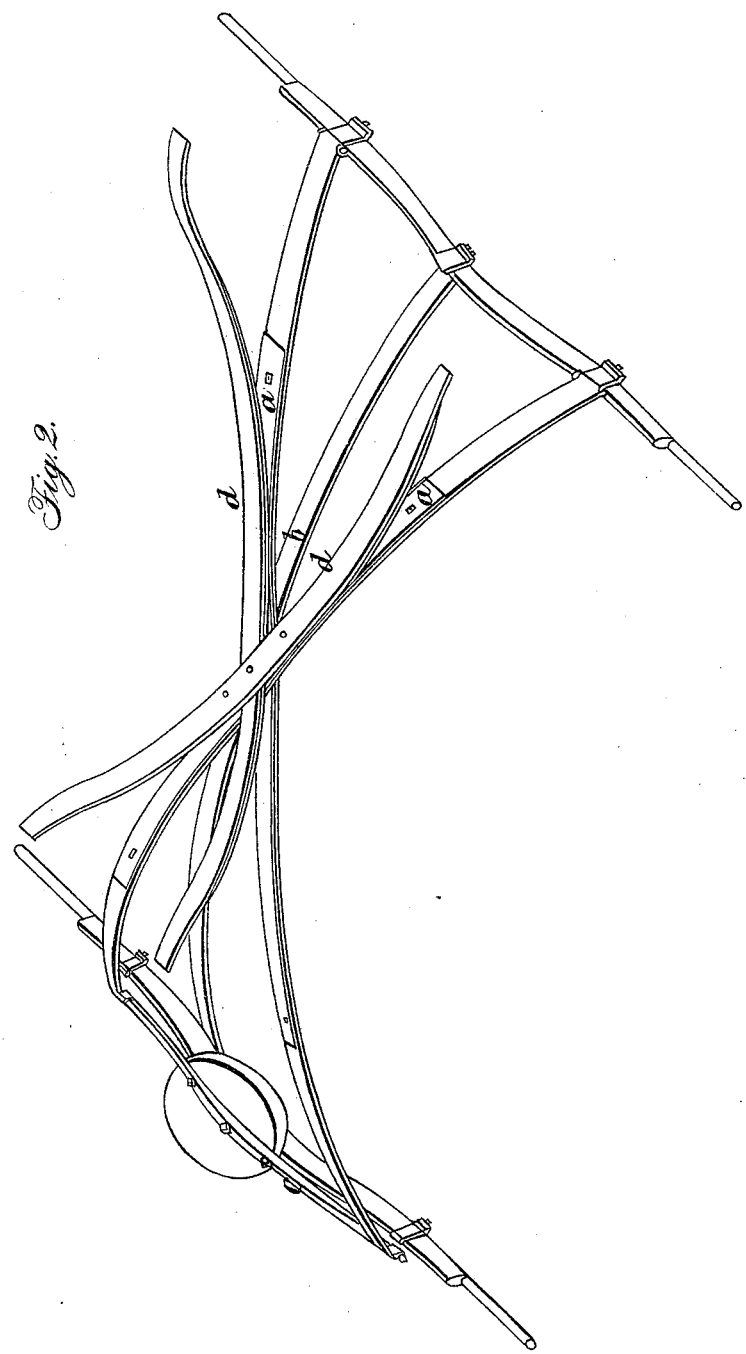

UNITED STATES PATENT OFFICE.

STARR FAIRCHILD, OF TRUMBULL, CONNECTICUT.

IMPROVEMENT IN HANGING CARRIAGE-BODIES.

Specification forming part of Letters Patent No. 5,413, dated January 18, 1848.

*To all whom it may concern:*

Be it known that I, STARR FAIRCHILD, of Trumbull, in the county of Fairfield and State of Connecticut, have invented new and useful Improvements in the Mode of Attaching Springs to the Running-Gear of Carriages by the Arrangement of Stays or Spring-Braces; and I do hereby declare that the following is a full, clear, and exact description thereof, reference being had to the accompanying drawings, which form a part of the same, in which—

Figure 1 is an isometrical view. Fig. 2 is a modification.

The nature of my invention consists in the application of stays or spring-braces, in combination with semi or reverse elliptic springs extending from one axle-tree to the other in constructing the running-gear of carriages, and in attaching the springs and stays firmly to the axle-trees, both operating and expanding together, thus dispensing with the common elliptic spring and perch, as hereinafter more fully described.

The construction is as follows: Two semi-elliptic springs $a\ a$, Fig. 1, that extend from the rear axle-tree of a carriage at one end, and thence parallel with the sides of the body to the spring-bar or bolster-block $c$ over the front axle-tree at the other, or each side spring may extend diagonally across each other under the body of the carriage to the opposite end of the spring-bar $c$, as represented by modification, Fig. 2. These springs are sufficiently supported upon the axle-tree by spring braces or stays $b$, that extend from the rear axle-tree of the carriage and join near the center of each spring, and thence inward to the front axle or king-bolt, said stays being attached firmly on the opposite side from the spring, which is also firmly secured on the axle-tree and serves to keep the axle upright and the spring substantially in place, and admitting of regularity of spring or motion and expansion of both the stays and springs at the same time, thus dispensing with the usual perch and elliptic springs. Two other springs $d$ may be placed over those first named, of similar shape, but reversed so the ends curve up. On these the body may be attached by any of the known fixtures, allowing a roll or sliding motion at the ends to admit the spring $d$ freely to operate and expand, and the body may be placed on the springs $a\ a$ in combination with the stays $b$, if desired, without the top springs $d$, and said stays $b$ and springs $a\ a$ may be attached to shackles which are inserted into or through the axle-tree, as represented in the drawings, and made fast by nuts or otherwise firmly secured, which aids to accomplish the aforesaid freedom of action in all its parts. The advantage and effect of thus suspending in combination the springs and stays, as above described, are not only to dispense with the perch and common elliptic springs, but giving an increased amount of spring to the carriage with less labor, weight, and cost of material in its construction, combining greater economy both in the first cost and maintenance, and diminishing all sudden and unusual resistance which the wheels may meet with by permitting the axles to retreat as the springs and stays expand, thus lessening the shock, imparting ease to the horses, producing greater safety and durability to the carriage, and extraordinary ease and comfort to the rider.

What I claim as my invention, and desire to secure by Letters Patent, is—

Connecting the back axle with the front one and with the bar $c$ by means of the reverse elliptic springs and stays which sustain the body of the carriage, thus dispensing with the usual perch and elliptic springs and diminishing the expense of the carriage and rendering its action easier, substantially as herein described.

STARR FAIRCHILD.

Witnesses:
REUBEN FAIRCHILD,
HESEKIAH S. NICHOLS.